Patented Dec. 23, 1941

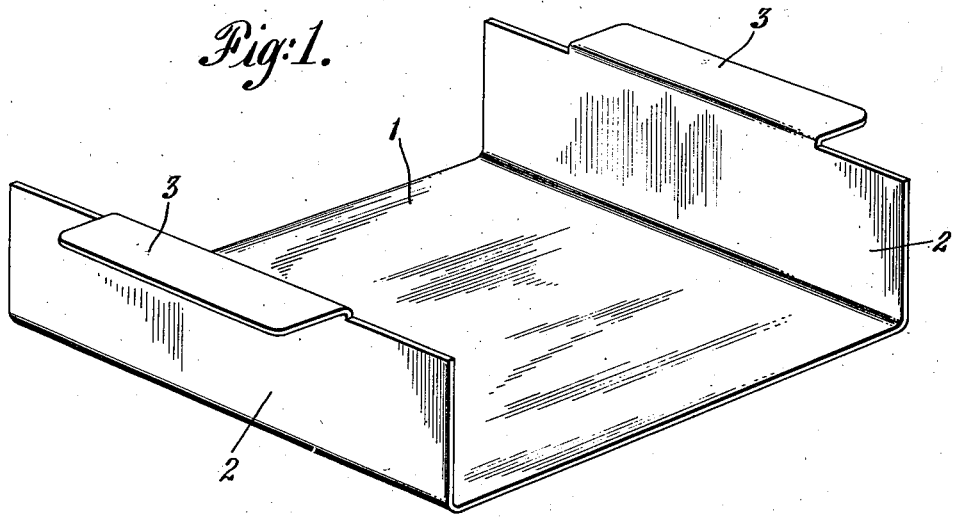
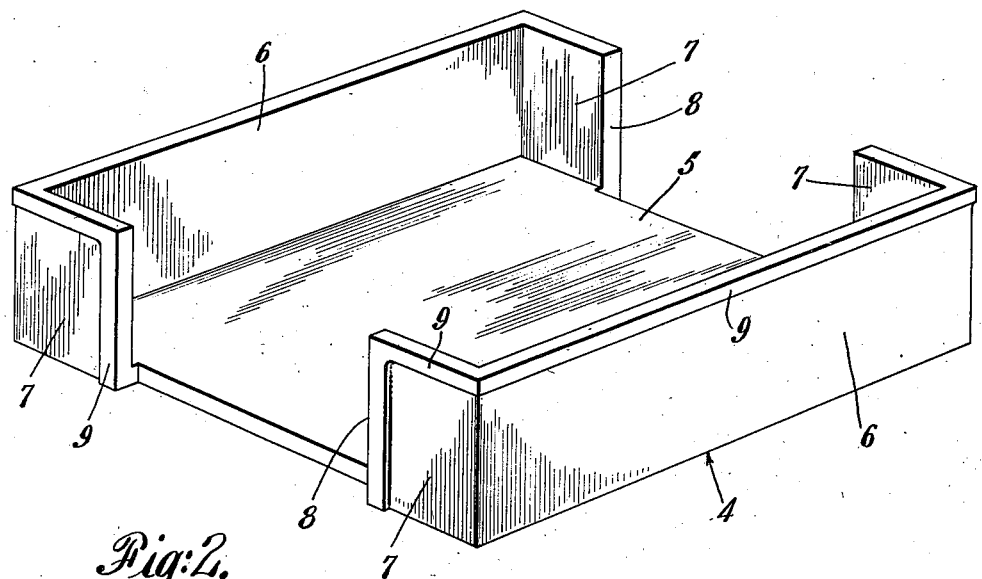

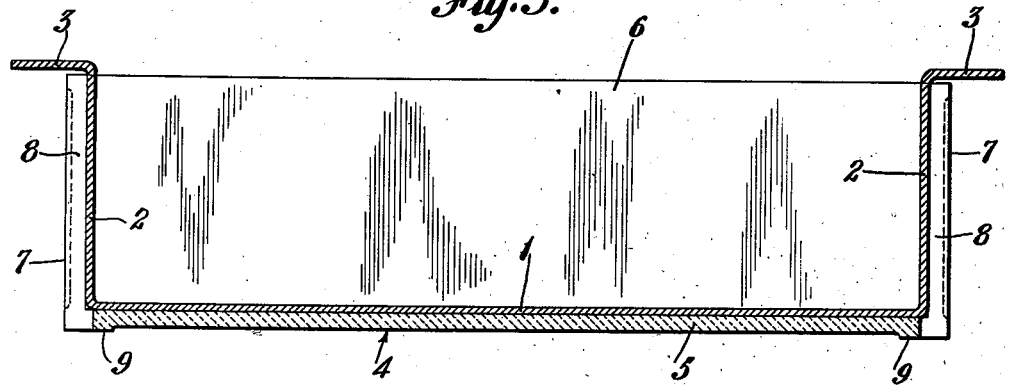
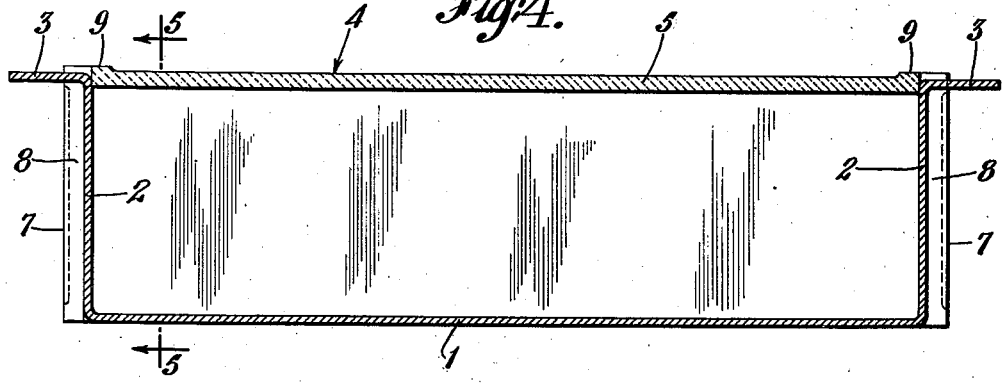
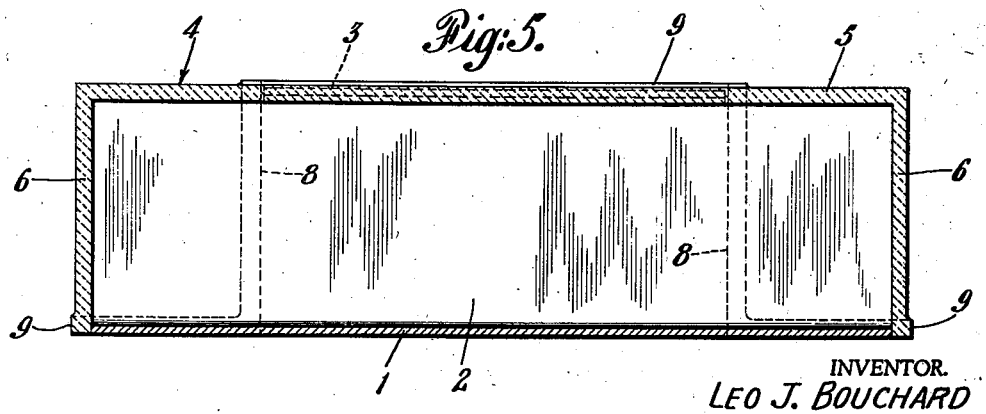

2,266,844

UNITED STATES PATENT OFFICE 2,266,844

MOLD

Leo J. Bouchard, New York, N. Y., assignor to The Best Foods, Inc., New York, N. Y., a corporation of Delaware Application April 8, 1938, Serial No. 200,897

4 Claims. (Cl. 31—42)

This invention relates to a mold for molding plastic materials and particularly to a tray mold suitable for use in molding margarine in the home after the coloring material has been added to it. It is, of course, also useful in the molding of other plastic or viscous materials, for instance, it may be used to mold butter, ice cream, etc.

In describing the invention reference will be made to the drawings, in which an embodiment of the invention is illustrated.

Figure 1 of the drawings is a perspective view of a tray.

Figure 2 is a perspective view of a container to be used with the tray.

Figure 3 is a vertical sectional view illustrating the container and tray in position for use as a mold.

Figure 4 is a vertical sectional view showing the container inverted to serve as a cover for the material in the tray.

Figure 5 is a section on the line 5—5 of Figure 4.

The numeral 1 designates a tray which may be of light metal, such as aluminum or other suitable material, having its ends bent or otherwise formed to extend upwardly to provide the ends 2 and outwardly to provide the handles 3. This tray does not have any sides and may be conveniently made by a single stamping or molding operation.

The container 4 has a bottom 5 and side walls 6, 6. The side walls extend around the corners to provide end sections 7, 7, which sections terminate a sufficient distance apart to allow a space 8 adapted to receive the handles 3 of the tray. This container may be made of any suitable material, such as a synthetic plastic material, for example, a urea-formaldehyde resin (Beetle ware), a phenol-formaldehyde resin (Bakelite), a vinyl resin (Vinylite), or an alkyd resin (Glyptal), or it may be made of other natural or synthetic materials, such as metal, glass, wood, regenerated cellulose or other materials having sufficient rigidity and suitable for contact with the material to be molded. The container may be formed by stamping or molding or otherwise forming the material into the desired shape and, if desired, it may be reinforced to increase its rigidity by providing a beading, as indicated at 9. Or, if preferred, the cover may be made up of a number of sections suitably fastened together with metal or other material.

In using the invention as a mold, the container 4 is positioned as illustrated in Figure 2 and the tray 1 is placed in it, as illustrated in Figure 3. The size of the container is such that the tray fits snugly within it. The material to be molded is then introduced and molded to the shape of the mold resulting from the tray and container.

After the material is molded to the desired shape, the container is withdrawn from the tray and is then inverted and placed over the material in the tray, as illustrated in Figure 4. The handles 3 of the tray project beyond the container-cover and may be used in lifting the covered tray. When it is desired to use the margarine or other material in the mold, the container-cover may be taken off and the molded material removed. If it is desired to use only a portion of the molded material, the desired portion may be cut off and removed. The absence of sides on the tray serve to allow the knife or other implement to cut the material to the bottom with a smooth even cut.

It is obvious that variations may be made in the mold and it is not intended to limit the invention to the particular embodiments described or illustrated. The terms used in describing the invention have been used in a descriptive sense and not as terms of limitation and it is intended that all equivalents thereof be included within the scope of the appended claims.

I claim:

1. A mold comprising a unitary rigid container having side and end walls with openings in two opposite walls, and a rigid removable unitary sideless tray adapted to fit within said container and having portions serving to close the said openings and portions serving as handles shaped to extend into said openings, said container being adapted to be inverted to serve as a cover and to close the open sides of the tray.

2. A mold as defined in claim 1 in which the said tray has portions adapted to bear upon said opposite walls.

3. A mold as defined in claim 1 in which the handles are integral portions of the tray.

4. A mold comprising a unitary rigid container having side and end walls with openings in said opposite end walls, and a rigid removable unitary sideless tray adapted to fit within said container and having portions adapted to extend beyond and close said openings and having portions serving as handles shaped to extend through said openings, said container being adapted to be inverted to serve as a cover and to close the open sides of the tray.

LEO J. BOUCHARD.